June 8, 1965   H. W. WAGEMANN   3,188,450
PERFORATED RECORD SENSING DEVICE
Filed June 10, 1960
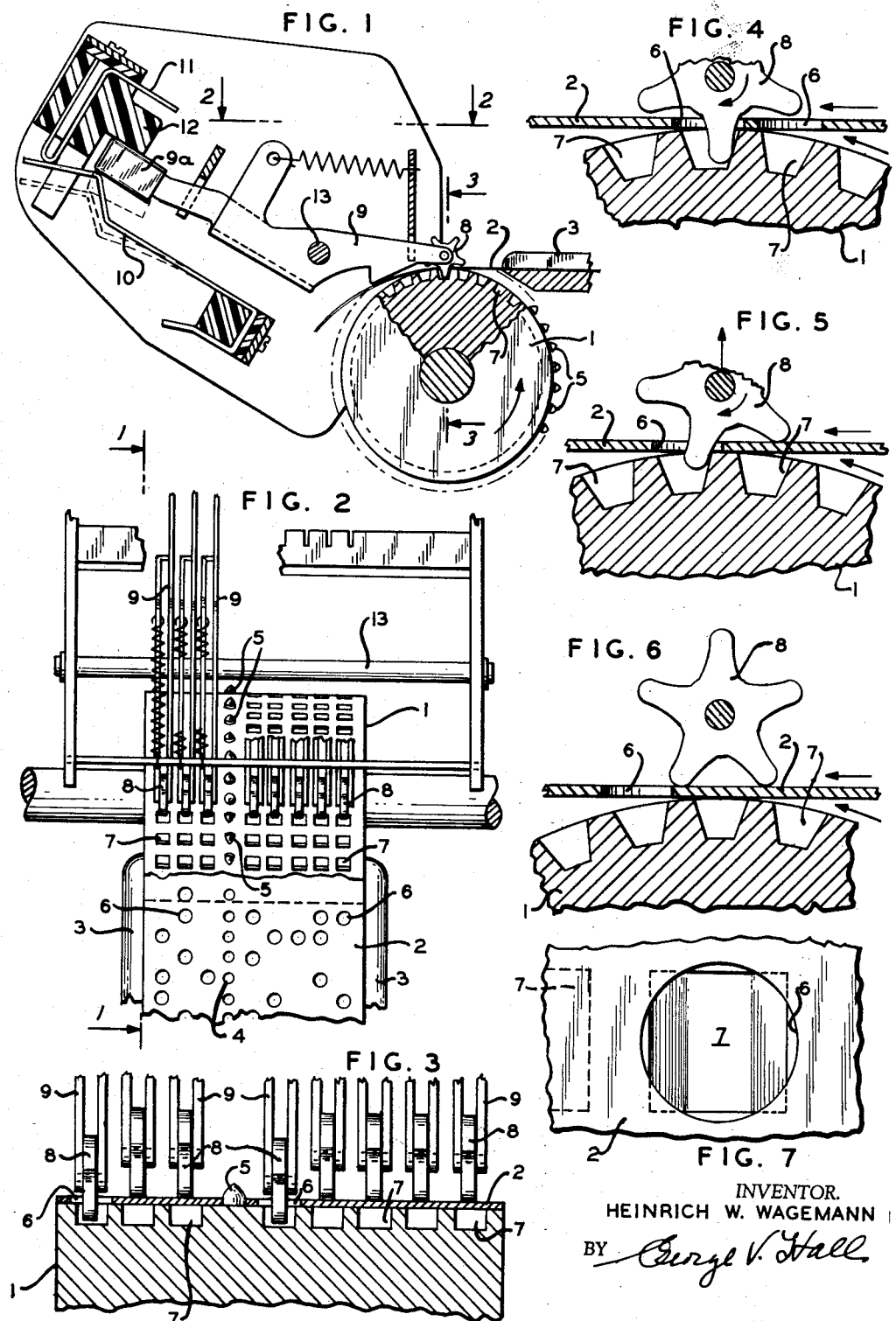
INVENTOR.
HEINRICH W. WAGEMANN
BY
ATTORNEY

United States Patent Office 3,188,450
Patented June 8, 1965

3,188,450
PERFORATED RECORD SENSING DEVICE
Heinrich W. Wagemann, West Orange, N.J., assignor to Monroe International Corporation, a corporation of Delaware
Filed June 10, 1960, Ser. No. 35,163
2 Claims. (Cl. 235—61.11)

This invention relates to devices for sensing perforations in a record medium such as a tape or the like, and more particularly to such devices employing a toothed wheel for sensing each row of perforations in the medium.

Devices including toothed wheels for sensing perforated records are well known in the art. In such a device, a toothed wheel is rotatably mounted at the end of a lever and rests upon the record medium such as a tape which is transported linearly so that a row of perforations will be sensed by the wheel.

When the wheel engages a nonperforated section of the row, a pair of teeth of the wheel will rest on the tape surface and the wheel will be held in a raised position. When a hole arrives and passes beneath the first tooth of the pair, the tooth will roll into the hole, allowing the center of the wheel to drop, thereby rocking the supporting lever and closing a pair of electrical contacts. Continued advance of the tape will cause the trailing edge of the hole to engage the entered tooth and turn the wheel to finally cam the tooth out of the hole leaving the wheel advanced one tooth. If another hole does not immediately follow, the wheel will be raised as it is turned and the contacts will be restored.

Where the holes immediately follow one another, they are spaced center from center a distance equal to the pitch of the teeth of the wheel. In this instance, the teeth of the wheel will roll successively from hole to hole without raising the wheel and the contacts will accordingly remain closed as long as the succession of holes immediately follow one another. Under such condition, means for pulsing a circuit upon engagement of each perforation may comprise an auxiliary pulsing device operable in timed relation with the movement of the record tape and connected in the circuit with the contacts in well-known manner.

In the devices briefly outlined above, the sensing wheels are rotated by engagement of the trailing edges of the perforations with the teeth of the wheels. If the tape is repeatedly sensed in this manner, the edges of the perforations will become worn and eventually mutilated. The tape therefore may no longer be usable.

It is accordingly the principal object of the invention to provide a perforated record sensing device employing toothed sensing wheels which will minimize wear of the perforations.

Another object of the invention is to provide a perforated record sensing device employing toothed sensing wheels wherein the wheels are not rotated by engagement of the edges of the perforations with the teeth.

A further and more specific object of the invention is to provide a perforated record sensing device employing toothed sensing wheels which are rotated by means operable upon passage of the wheel teeth through the perforations without engagement of the edges of the perforations with the teeth.

Other objects and advantages of the invention will be evident from the following description with reference to the accompanying drawings in which:

FIG. 1 is a sectional view of the perforated record sensing device taken on the line 1—1 of FIG. 2.

FIG. 2 is a top plan of the sensing device as viewed in the direction of the arrows 2—2 of FIG. 1.

FIG. 3 is a fragmentary section taken on the lines 3—3 of FIG. 1.

FIGS. 4, 5, and 6 are detailed fragmentary sections of one of the sensing wheels in association with a perforated record tape and a transport drum.

FIG. 7 is a fragmentary plan view of a tape perforation in registration with a recess in the transport drum.

The invention is disclosed as embodied in a reader for perforated record tape. The reader includes a rotatable drum 1 for transporting the record tape 2. Tape 2 passes from a guide 3 over drum 1 where sprocket holes 4 (FIGS. 2, 3) in the tape are engaged by sprocket teeth 5 of the drum. Consequently, upon counterclockwise rotation of drum 1 (FIGS. 1, 4, 5, 6) tape 2 will be advanced toward the left. Drum 1 may be driven continuously or intermittently by well-known means.

Tape 2 is punched in successive transverse equidistantly spaced columns which form linear rows. As illustrated, the tape is perforated in an eight channel code (FIGS. 2, 3). There are therefore eight rows of perforations 6 with one to eight perforations in each column. Obviously the particular number of channels in the code has no significance with respect to the invention.

For each row of perforations 6 of tape 2, there is an annulus of like recesses 7 equidistantly spaced circumferentially around the periphery of drum 1. The circumferential spacing of the centers of the recesses of each annulus is substantially equal to the spacing of the perforations of a row when there is a perforation in successive columns of the row. When there is no perforation in one or more successive columns of a row, the spacing of the next perforation in the row obviously will be a multiple of the spacing when there is a perforation in successive columns. Consequently, as tape 2 is advanced over drum 1, perforations 6 of each row will be brought successively into registration with the recesses 7 of the associated annulus as shown in FIGS. 4, 5, and 7. It will be noted that the perforations are circular and the recesses are square. This difference in shape has no significance with respect to the invention and is a matter of expediency.

Furthermore, it will be noted that the diameter of perforations 6 is greater than the dimension of recesses 7 circumferentially of the drum. The reason for this difference will be described later.

A five toothed gear wheel 8 for sensing each row of perforations 6 is adapted for meshing engagement with the associated annulus of recesses 7 by passage of the gear teeth through the perforations in registration with said recesses. The pitch of the teeth of wheel 8 therefore is substantially equal to the spacing of the centers of the perforations of the associated row when the perforations occur in successive columns. From the above it will be seen that an annulus of recesses 7 is, in effect, a gear which is adapted to drive a gear wheel 8. Drum 1 therefore could comprise a series of gears, each adapted to mesh with a gear wheel 8 and suitably spaced by spacing rings or washers.

Each gear wheel 8 is rotatably mounted at one end of a lever 9 which is spring urged clockwise (FIG. 1). The gear wheel is thus urged toward engagement with the associated annulus of recesses 7. Levers 9 have common pivotal mounting on a shaft 13 parallel with the axis of drum 1. Wheels 8 therefore are aligned so that they may simultaneously sense all perforations in each column. The opposite end of each lever 9 terminates in an insulating cap 9a which engages a contact member 10 which is resiliently biased clockwise toward engagement with a fixed contact 11.

When a wheel 8 is moved to engagement with the annulus of recesses 7 (FIG. 1), as later described, lever 9 will be rocked clockwise to engage insulating cap 9a with limit stop 12. This will permit resilient contact 10 to move into engagement with fixed contact 11 with limit stop 12 arresting movement of the parts thereby preventing the ends of the teeth of gear wheel 8 from bearing on the bottoms of recesses 7 as shown in FIG. 4. When wheel 8 is raised (FIG. 6), as later described, to disengage the annulus of recesses, lever 9 will be restored counterclockwise to disengage contacts 10, 11.

Tape 2 is fed between drum 1 and wheels 8, and is advanced by sprocket teeth 5 as the drum is rotated. When a wheel 8 engages a nonperforated section of the associated row (FIG. 6), a pair of teeth of the wheel will rest on the tape surface and the wheel will be held in raised position. Consequently, the associated contacts 10, 11 will be open. When a perforation arrives and passes beneath the first tooth of the pair, the tooth will roll into the perforation and thus into meshing engagement with the registered recess 7 as shown in FIG. 4. This will allow the center of wheel 8 to drop, thereby rocking supporting lever 9 and permitting closure of contacts 10, 11 (FIG. 1). Further rotation of drum 1 will cause engaged recess 7 to finally cam the engaged tooth out of the recess and registered perforation leaving the wheel advanced one tooth. If another perforation does not immediately follow, the wheel will be raised as it is turned (FIG. 5) and contacts 10, 11 will be opened.

Where the perforations immediately follow one another (FIG. 4), the teeth of wheel 8 will roll successively through the perforations 6, without engaging the edges of said perforations, to engagement with the respective successive recesses 7. In this operation there will be no raising and lowering of wheel 8 because the tooth ends of the wheel will be held from engagement with the bottoms of recesses 7 by stop 12. Accordingly, contacts 10, 11 will remain closed as long as the succession of holes immediately follow one another.

In the above, it was noted that the teeth of wheel 8 do not engage the edges of the perforations through which they pass when said perforations immediately follow one another (FIG. 4). The greater size of perforations 6 with respect to the recesses 7 (FIG. 7) provides for this operation which obviously completely eliminates wear of the perforations at this time.

When perforations 6 do not immediately follow one another (FIGS. 5, 6), the trailing edge of a perforation will momentarily engage the entered tooth to complete the lifting action after the tooth leaves registered recess 7. At this time, wheel 8 is in motion and is near completion of its upward movement and rotation. Therefore, there is little or no inertia to overcome, and wear on the perforation is reduced to a minimum.

The invention has been disclosed as employing five toothed sensing wheels. Obviously, without departing from the principle of operation, sensing wheels having other numbers of teeth may be employed. Furthermore, the invention has been disclosed as adapted for reading punched tape but could be readily adapted for use in a punched card reader. The invention therefore is to be restricted only as necessitated by the scope and spirit of the appended claims.

I claim:

1. In a device for sensing a perforated record strip having a linear row of like perforations including equidistantly spaced perforations and perforations spaced at multiples of the distance of the spacing of said equidistantly spaced perforations; a rotatable drum having an annulus of like recesses equidistantly spaced circumferentially around its periphery, the centers of said recesses being spaced a distance substantially equal to the spacing of the centers of said equidistantly spaced perforations, means for transporting said strip linearly upon rotation of said drum to bring said perforations successively into registration with said recesses, a wheel having teeth adapted for meshing engagement with said annulus of recesses, said teeth being so spaced as to be engaged successively by the successive recesses of said drum upon rotation of said drum in either direction thereby rotating said wheel and said recesses having a depth to permit said driving engagement with said teeth without the bottoms of said recesses engaging said teeth, means adjustably mounting said wheel for movement away from and toward engagement of its teeth with said annulus of recesses, means for yieldably urging said wheel toward said drum for passage of its teeth through said perforations into meshing engagement with said annulus of recesses, a pair of electrical contacts, and means simultaneously operable with movement of one of said teeth to engagement with one of said recesses to close said contacts.

2. The invention according to claim 1, characterized by the provision of a stop operable upon engagement of a tooth of said wheel with one of said recesses to prevent said tooth from engaging the bottom of said recess.

References Cited by the Examiner
UNITED STATES PATENTS

| | | | |
|---|---|---|---|
| 1,913,735 | 6/33 | Thompson | 235—61.11 |
| 2,345,289 | 3/44 | Reiber | 235—61.11 |
| 2,843,319 | 7/58 | Deutsch | 235—61.11 |
| 3,027,072 | 3/62 | Levin | 235—61.11 |

MALCOLM A. MORRISON, *Primary Examiner.*

CORNELIUS D. ANGEL, DARYL W. COOK,
*Examiners.*